United States Patent

[11] 3,626,312

| [72] | Inventor | Elias Snitzer<br>Wellesley, Mass. |
|---|---|---|
| [21] | Appl. No. | 765,099 |
| [22] | Filed | Oct. 4, 1968 |
| [45] | Patented | Dec. 7, 1971 |
| [73] | Assignee | American Optical Corporation<br>Southbridge, Mass. |

[54] LASER PREAMPLIFIER
10 Claims, 9 Drawing Figs.

| [52] | U.S. Cl. | 330/4.3,<br>250/199 |
|---|---|---|
| [51] | Int. Cl. | H01s 3/02 |
| [50] | Field of Search | 330/4.3;<br>250/199 |

[56] References Cited
UNITED STATES PATENTS 3,235,813  2/1966  Kogelnik et al............... 330/4.3

Primary Examiner—Rodney D. Bennett, Jr.
Assistant Examiner—Daniel C. Kaufman
Attorneys—William C. Nealon, Noble S. Williams and Robert J. Bird ABSTRACT: A light energy detector which includes a laser preamplifier coupled to means for converting the amplified light into electrical energy is provided. The detector is capable of detecting 1.06 micron wavelength light and is capable of detecting a minimum signal of approximately 1,000 photons or less at a duration of 50 nanoseconds or less.

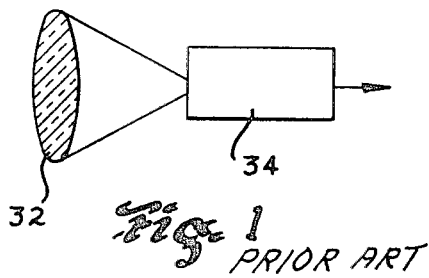
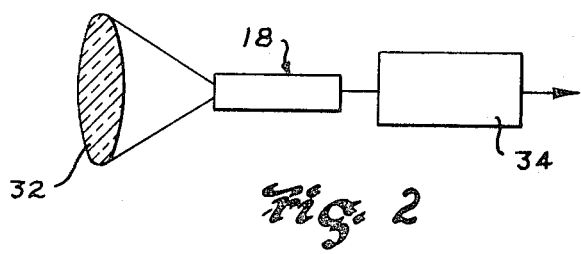
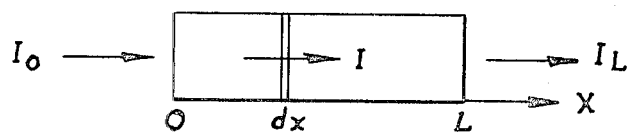
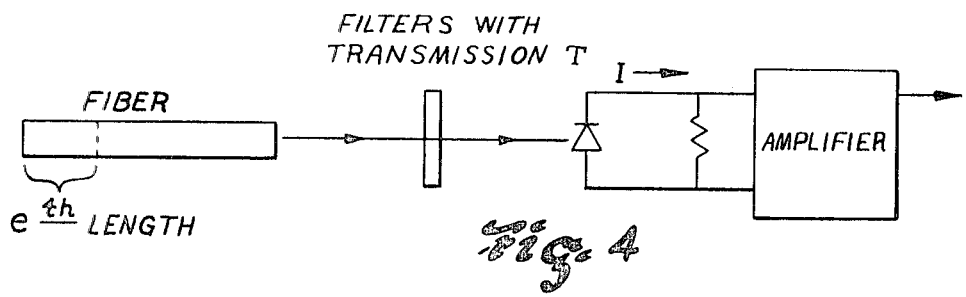
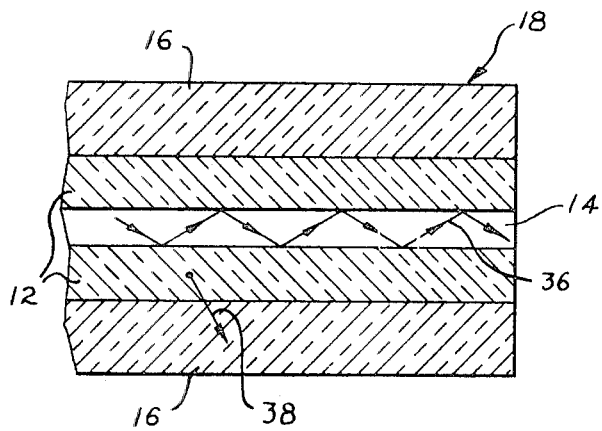

INVENTOR.
ELIAS SNITZER
ATTORNEY

LASER PREAMPLIFIER

BACKGROUND OF THE INVENTION

The field of the invention is detectors capable of detecting light energy and transforming the light energy into a recognizable signal.

The prior art devices for detecting signals at 1 micron wavelength are photomultiplier tubes and semiconductor photodiodes. A photomultiplier tube is limited in detection sensitivity by the quantum efficiency for electronic photoemission. The photodiode is limited in detection sensitivity by the thermal noise in the amplifier used to detect a change in the conductance of the diode. The detection of weak signals is difficult since the noise associated with the detectors is large when compared to a weak signal. Detectors have two limits—a small value for the probability of no detection and a small value for the probability of false detection. Thus, the smallest signal that a detector system can recognize without error is termed the minimum detectable signal. It is well known in the art that in order to obtain a signal of sufficient intensity in a photomultiplier tube approximately 25 photoelectrons must be emitted from the photocathode of the photomultiplier tube to produce a minimum detectable signal. The number of incident photons necessary to produce the minimum detectable signal for a photomultiplier tube is 25 divided by the quantum efficiency of the photocathode. The photocathode used to detect light at 1.06 microns wavelength is an S-1 surface. The S-1 photo surface has a quantum efficiency of about 0.025 percent. The minimum detectable signal is therefore, approximately 10 photons.

The photodiode has a high quantum efficiency of approximately 50 percent but the minimum detectable signal is limited by the noise associated with the first stage of amplification in the electronic amplifier used to measure the change in conductance associated with the light incident on the diode. Known electronic instrumentation for use with photodiodes have thermal noise limits that restrict the minimum detectable signal to approximately 50,000 photons.

The avalanche photodiode has been employed in a detector system. With an avalanche photodiode, gain is provided in the diode which gain boosts the signal before entering the electronic amplifier. However, the avalanche diode employed to provide gain also produces noise. In fact, the amount of noise increases at a faster rate than the gain. The avalanche diode can be adjusted so that the noise produced by the avalanche is equal to the noise produced by the first stage of electronic amplification. Thus the minimum detectable signal for avalanche diode detectors as compared with nonavalanche diode detectors is reduced by 50 percent of the gain produced by the avalanche diode. At room temperature the useful value for the gain is within the range of approximately 10 to 25. The minimum detectable signal for 1.06 micron wavelength radiation by avalanche diode systems is then approximately 15,000 photons.

The detector of the instant invention, in its simplest form, is capable of detecting signals of approximately 1,000 photons. Other embodiments of the invention can reduce the minimum detectable signal by as much as a factor of 10 or more.

SUMMARY OF THE INVENTION

The present invention is a light energy detector system for detecting laser light including a laser as a preamplifier. The laser amplifier is capable of providing gain to signals entering the detector system at the signal's incident radiation wavelength. The laser amplifies the incident signal to a sufficiently high value so that it can be readily detected by previously known detection devices. Thereafter, means are provided for blocking low frequency and DC spontaneous emission to decrease system noise.

Accordingly, it is an object of the invention to provide a detector system for detecting radiation at 1.06 microns wavelength.

A further object of the invention is to provide a detector system capable of detecting a minimum signal of 1,000 photons or less.

It is a further object of the invention to provide a system for detecting images where the number of photons needed for each image point is 1,000 photons or less.

It is a further object of the invention to provide a laser amplifier detector system for detecting laser light at any wavelength providing the laser amplifier is capable of providing gain in a single mode.

BRIEF DESCRIPTION OF THE DRAWING

FIG. 1 is a schematic diagram illustrating a detector system of the prior art;

FIG. 2 is a schematic diagram illustrating an embodiment of the detector system of the instant invention;

FIG. 3 is a diagram useful in explaining the operational theory of the invention;

FIG. 4 is a diagram of a model useful in experimentally verifying the theory of the invention;

FIG. 5 is a cross-sectional view of a fiber showing diagrammatically the principle of total internal reflection;

DESCRIPTION OF THE PREFERRED EMBODIMENTS

Figure 6:
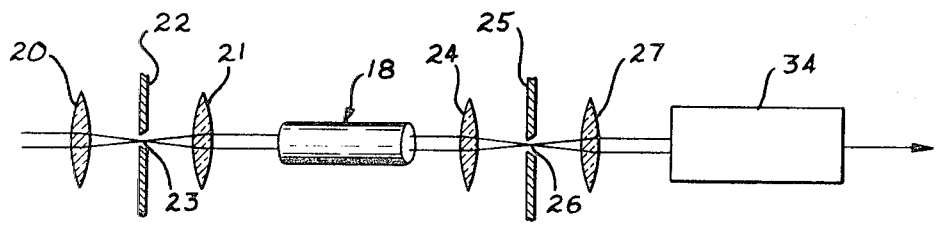
FIG. 6 is an embodiment of the invention as shown in FIG. 2.

FIG. 1 and FIG. 2 illustrate the two types of receivers, the essential difference being the presence or absence of an optical amplifier before the detector.

Noise in a conventional receiver consists of shot noise, thermal noise and amplifier noise. For simplicity it can be assumed that the dark current in the diode is the primary source for shot noise. Thus, selection of a photodiode with low dark current will insure low shot noise. However, it will be shown that the thermal noise from the load resistor is usually two orders of magnitude larger than the shot noise. The total thermal noise power is increased by a "noise factor" F which is the excess noise of the amplifier. A good amplifier will have F ranging in value from 2.5 to 10. Examination of commercially available solid-state photodiodes shows that diodes suitable for laser detection have shot noise which is much less than thermal noise. The noise equivalent input power (NEP) or the detectivity (D*) is a measure of the noise in the diode. It can easily be shown that a diode with $$D^* > 10^9 \frac{cm - \sqrt{H_z}}{watt}$$

has less noise than the amplifier. Thus the criteria for selecting a diode are (a) $D^* > 10^9$ (b) rise time, (c) quantum efficiency, and (d) active area size. Certainly all laser detection diodes satisfy (a) so that the remaining three are used only to satisfy system requirements.

Since noise cannot be reduced, an approach is to increase the signal. Recently the avalanche diode has been commercially introduced. This diode increases signal power by $G^2$ where G is the internal current gain and increases noise power by $G^{2.5}$. Since noise increases faster than signal, the optimum gain is chosen such that the amplified shot noise is just equal to the thermal noise. The calculated minimum detectable signal for an avalanche diode is about 1/15 of that for a conventional diode in a typical system.

As will be shown later in one embodiment of the invention, if the optical amplifier is a fiber laser, said fiber laser can increase the signal current by 45 db. while increasing noise current only 4.2 db. The limiting noise source in an optical amplifier is the random fluctuations of the spontaneous emission.

The spontaneous emission is often considered as noise. However, since the pump pulse is relatively long ($\approx 1$ msec.), the spontaneous emission is also long. Thus, the envelope of the emission contains many low-frequency components which can effectively be blocked with an electronic amplifier with a band-pass from approximately 50 kH$_z$. to 30 MH$_z$. The important noise to consider is only the random fluctuation of the spontaneous emission which corresponds to random emission of photons. The amount of noise generated depends on the square root of the number of modes propagating in the amplifier. Therefore, it is advantageous to have a lowest-order mode or single-mode fiber. Mode patterns in fibers are treated in:

E. Snitzer and H. Osterberg, "Observed Dielectric Wave Guide Modes in the Visible Spectrum," J. Opt. Soc. Am. 51, p. 499 (1961); and, E. Snitzer, "Cylindrical Dielectric Wave Guide modes," J. Opt. Soc. Am. 51, p. 491 (1961), the teachings of which are incorporated by reference.

Spontaneous Emission and Spontaneous Emission Noise In A Fiber

Spontaneous emission and spontaneous emission noise can be calculated for a lowest-order-mode fiber. The total spontaneous emission is $N_3$ $(G-1)$ photons per second and the root-mean-square value of the random fluctuations is $$\sqrt{\frac{2N_e}{\tau}(G-1)}$$

photons per second where $\tau$ is the observation time. This emission can be interpreted as $N_e$ photons generated in the $e^{th}$ length which are subsequently amplified $G-1$ times. Similarly, the root-mean-square value can be considered as $$\sqrt{\frac{2N_e}{\tau}}$$

photons generated in the $e^{th}$ length which are also amplified $G-1$ times. The $e^{th}$ length is defined as that length which gives a gain of $e$, i.e., $G=e=e_\beta L$. The $e^{th}$ length is $$L_e = \frac{1}{\beta} : \beta = \text{gain coefficient in } \%/\text{cm}.$$

A light beam of intensity I photons/(cm$^2$-sec) as it passes through an incremental length $dX$ in a fiber of length L with an inversion of N ions/cm.$^3$) (see FIG. 3) is considered with the assumption that the fiber is lossless. The intensity increases as $dI/dx = \beta I$ where $\beta$ is the gain coefficient   (1)

Equation (1) can be integrated over the whole length to yield the total gain:

$I_L = I_0 i^{\beta L} = I_0 G$ $\beta$ can be expressed in terms of Einstein's A and B coefficients.

$$\frac{dI}{dx} = \frac{nI}{c} N h \mu B \quad (2)$$

where $nI/c$ is the number of photons per cm$^3$. 3.
Solving (1) and (2) yields $$\beta = N \frac{n}{c} h \mu B \quad (3)$$

The probability for spontaneous emission of photons per unit volume is given by Einstein's A coefficient:

$A = M h \nu B$ where $M$ is the mode density, i.e., number of modes per unit volume   (4)

The total number of photons emitted for N atoms in the unit volume is $MNhB$. If the fiber has a cross-sectional area D then the total number of photons emitted per unit length is $MNhBD$ and the number of photons $N_3$ emitted in the $e^{th}$ length is $N_e = MNhbhxBD/\beta$.

If these photons are generated in the incremental length $dx$ they will experience a gain of $e_\beta^{(L-x)}$. Integrating over the entire length gives the total number of photons emitted per second as spontaneous emission $$N_T = \int_0^L e^{\beta(L-X)} M N h \nu B D \, dx$$

$$= M N h \nu B D \left( \frac{e^{\beta L} - 1}{\beta} \right) = Ne(G-1) \quad (5)$$

Thus the total number of photons emitted is equivalent to having $N_e$ photons generated in the $e^{th}$ length which are subsequently amplified $G-1$ times. It is obvious that both $N_e$ and $N_T$ increase linearly with the mode density $M$. For a low-noise detection system, it is advantageous to have a laser with the lowest-mode density. Here lies the advantage of a lowest-order mode fiber laser amplifier.

The mode density for a fiber which supports only the lowest order mode in the Z direction is $$M = \frac{2 \Delta P_z L_z}{h V}$$

where $V$ is the volume and the factor 2 accounts for both possible planes of polarization. Using the DeBroglie relation $$P = \frac{h}{\lambda} = \frac{n}{c} h \nu$$

the mode density becomes $$M = 2 \frac{n}{c} \frac{1}{D} \Delta \nu \text{ where } V = D L_z$$

Thus the total number of photons emitted per second is $$N_T = \left( \frac{2n}{c} \frac{1}{D} \Delta \nu \right) N h \nu B D \left( \frac{e^{\beta L} - 1}{\beta} \right) \quad (6)$$

and using (3), equation (6) becomes $$N_T = 2 \Delta \nu \beta \left( \frac{e^{\beta L} - 1}{\beta} \right) = 2 \Delta \nu (G-1) \quad (7)$$

Comparing equation (7) with equation (5), the number of photons generated in the $e^{th}$ length of a single-mode fiber is $$Ne = 2\Delta = \nu \frac{2c}{\lambda^2} \Delta \lambda$$

For a Nd-glass laser $\lambda = 1.06\mu$ and for a pumped laser, the line width narrows to $\Delta \lambda \approx 100 A$ typically and $N_e = 6 \times 10^{12}$ photons/sec.

If $N_e$ is examined microscopically, fluctuations are seen corresponding to random emission of photons. These fluctuations can be described with a probability density function. Photons follow Poisson statistics which can be approximated with Guassian statistics for large numbers. For a complete discussion see the Central Limit Theorem, M, Ross, "Laser Receivers," John Wiley 1967, Chapter 2, the teachings of which are incorporated by reference. R. J. Glauber, "Photon Counting and Field Correlations," Physics of Quantum Electronics Conference, Puerto Rico, June 1965, P. L. Kelley, B. Lax and P. E. Tannenwald, ed., McGraw-Hill, 1966 has shown that statistical distribution for an optical amplifier is $$p(n) = \frac{n_0}{\sqrt{4(G-1)}} \frac{1}{n^{3/2}} e^{-\frac{1}{4(G-1)} \frac{(n-n_0)^2}{n}}$$

where $n_0$ is the average number of photons emitted from the amplifier. If $n - n_0 /n_0 << 1$ the distribution can be approximated with $$p(n) = \frac{1}{\sqrt{2\pi[2(G-1)n_0]}} e^{-\frac{1}{2} \frac{(n-n_0)^2}{2(G-1)n_0}}$$

which is a Gaussian distribution with the root-mean-square fluctuation $\sigma = \sqrt{2(G-1)n_0}$. If the observation time is $\tau$, then $N_e \tau$ is the total number of photons generated in the $e^{th}$ length during $\tau$. These photons are amplified so that $n_0 = N_e \tau (G-1) N'$ where the number of modes is given by $N'$, but with the two states of polarization already counted $N'=1$ for a single-mode fiber. Then $$\sigma = \sqrt{2(G-1)^2 N_e \tau N'} = \sqrt{2 N_e \tau N'}(G-1)$$

and the fluctuation per unit time is $$\frac{\sigma}{\tau} = \sqrt{\frac{2N_e N'}{\tau}} G - 1$$

This can be interpreted as the root-mean-square fluctuation generated in the $e^{th}$ length is $\sqrt{2N_e N'/\tau}$ photons/sec. and the amplified output as $\sqrt{2N_e N'/\tau}(G-1)$. The noise fluctuations increase as the square root of the number of modes $N'$. Thus a lowest-order mode (single mode) will have the lowest possible spontaneous emission and also the smallest fluctuations on the spontaneous emission.

To experimentally verify the above, the model in FIG. 4 is used. The total spontaneous emission $N_3(G-1)$ will produce a current in the detector $I_{SE}$ given by $$I_{SE} = [N_e(G-1)T]ES \quad E \quad S \quad (8)$$

$$= \begin{bmatrix} \text{total number of} \\ \text{photons per sec.} \\ \text{hitting photo-} \\ \text{diode} \end{bmatrix} \begin{bmatrix} \text{energy} \\ \text{per} \\ \text{photon} \end{bmatrix} \begin{bmatrix} \text{sensitivity of} \\ \text{detector in} \\ \text{amps/watt} \end{bmatrix}$$

Similarly the root-mean-square current due to spontaneous emission noise for a lowest-order mode fiber is $$I_N \sqrt{\frac{2N_e}{\tau}(G-1)} \; TES \quad (9)$$

The ratio $$\frac{I_{SE}}{I_N} = \sqrt{\frac{2N_e \tau}{2}} \quad (10)$$

can be measured experimentally. This ratio is a useful quantity in that it is independent of the gain of the amplifier and sensitivity of the detector. The observation time $\tau$ can be related to the bandwidth $B$ of the electronic amplifier as $\tau = 1/b$.

Fiber Considerations.

Since the noise generated in the fiber increases as the square root of the number of modes, it is advantageous to have a fiber that supports only the lowest-order mode. A neodymium doped clad fiber can be designed so that only the $HE_{11}$ mode is permitted. The characteristics of the core and claddings of a fiber drawn in accordance with the instant invention are given in the following table and shown in FIG. 5.

|  | Comments | Index of Refraction Sodium D-line | $1.06\mu$ |
|---|---|---|---|
| Core | Low-Loss Laser Glass | $n_1=1.5165$ | 1.5054 |
| First Cladding |  | $n_2=1.5163$ |  |
| Second Cladding | Samarium-doped to absorb $1.06\mu$ Radiation | $n_3=1.5179$ | 1.5078 |

In FIG. 5, first cladding 12, has an index of refraction, $n_2$, less than index of refraction, $n_1$, of core 14. Since $n_2 < n_1$ total internal reflection is possible. Second cladding 16 has an index of refraction, $n_3$, greater than $n_2$ so that any $1.06\mu$ radiation leaving the first cladding can enter the second and be absorbed by the samarium. The numerical aperture at 5,893 A. is $NA = \sqrt{n_1^2 - n_2^2} = 2.46 \times 10^{-2}$. Experimental results indicate that the above-descarded fiber is a fiber which supports only the $HE_{11}$ mode.

The above-described fiber is exemplary of a preferred embodiment of the invention. However, other diameter arrangements are possible.

The preferred method for reducing the number of traveling wave modes is by the use of a clad fiber whose cross-sectional area is small enough so that only the lowest-order $HE_{11}$ mode is able to propagate. If the fiber has core 14 with a circular cross section of diameter $d$, an index of refraction for core 14, $n_1$, and an index of refraction for cladding 12, $n_2$, the $HE_{11}$ mode will be the only mode propagated if the following is satisfied:

$$\frac{\pi d}{\lambda} \sqrt{n_1^2 - n_2^2} < 2.405$$

where $\lambda$ is the wavelength of light.

The modes referred to above are spacial wave guide modes associated with the propagation of light in one direction through a material. As has been shown a dielectric wave guide in a laser material is accomplished by cladding core 14 of laser material 18 with a transparent cladding 12 of lower refractive index than said core. With such a cladding the number of modes which can be propagated is equal to the number of dielectric waveguide modes the structure is capable of supporting. The number of modes which can be propagated is proportional to the differences in the squares of the indices of refraction for the core of laser material and the cladding and also proportional to the cross-sectional area of the core.

Solid Rod Considerations

The invention as discussed up to this point has been limited to fibers. However, it is also possible to propagate a single lowest-order mode in a solid rod of laser material. A solid rod of laser material has a transfer dimension many times that of the wavelength. In order to propagate only a single lowest order mode in a solid rod of laser material, two pair of lenses, each pair of lenses having a mask defining a pinhole aperture placed therebetween, positioned along the axis of the rod at opposite ends thereof, is employed. Each lens in a lens pair is spaced apart from one another a distance equal to the sum of the focal length for the lenses.

The exact arrangement of the four lenses and two masks defining pinholes is shown in FIG. 6. Lens 20 and 21 form a lens pair positioned at one end of laser rod 18 along an axis of said rod. Mask 22 is positioned between lenses 20 and 21 at a distance equal to focal length of lens 20, said mask having a pinhole aperture 23 centered along the axis of rod 18. Positioned between mask 22 and the entrance end of laser rod 18 is lens 21. Lens 21 is positioned at a distance from lens 20 equal to the sum of the focal lengths of lenses 20 and 21. Positioned at the exit end of rod 18 is lens 24. Also located along the axis of rod 18 is mask 25 defining pinhole aperture 26. Mask 25 is located at a distance from lens 24 equal to the focal length of lens 24. Also provided along the axis is lens 27 which is positioned at a distance from lens 24 equal to the sum of the focal lengths of lenses 24 and 27. Thus by positioning two lenses and a mask defining a pinhole at the prescribed distances at the entrance and exit ends of the laser rod the single lowest-order mode is isolated.

Dopant And Host Considerations

FIG. w is a diagrammatic illustration of the invention and consists of collecting optics 32 which can be a lens which functions to gather incoming laser light. Collecting optics 32 focuses the incoming laser light signal onto laser preamplifier 18. Preamplifier 18 is pumped by flash tubes (not shown) in a conventional manner in order to produce a state of population inversion in the active ions within said amplifier. Thus the incoming signal is preamplified and the preamplified signal emitted to detector 34. Detector 34 may be any of the prior art detectors discussed in the introduction of the specification capable of converting the amplified laser light into electrical energy. The essential difference between the prior art detector as shown in FIG. 1 and the detector of the instant invention as shown in FIG. 2 is the laser preamplifier used to amplify incoming signals. The detector of FIG. 2 is useful in detecting pulses of light from a Q-Switched laser whose time duration is approximately 50 nanoseconds. The invention of FIG. 2 is also useful for detecting light at approximately 1 micron wavelength. Thus, the detector of FIG. 2 can be employed in a range-finder system utilizing a neodymium-doped transmitter. The prior art detectors have been found to be inefficient for detection at this wavelength. In the case where the incoming signal is at a wavelength of about 1 micron, laser 18 is a neodymium-doped laser capable of supporting only the lowest-order mode. In the case of a rod the mode is isolated by the apparatus of FIG. 6. In the case of a fiber the lowest order, or $HE_{11}$, mode is the only mode propagated when the fiber is comprised of a laserable core and claddings as previously taught. Referring to FIG. 5 core 14 is doped with a laserable quantity of neodymium ions. Core 14 is surrounded by first cladding 12 so that total internal reflection of the light as shown by arrow 36 occurs. Fiber 18 also has a second cladding 16 which is doped with ions capable of absorbing energy at the emissive wavelength of the core and which is transparent at the pumping wavelength of the core. Thus, as is shown by arrow labeled 38, any radiation passing through the first cladding will be absorbed by the active ions within cladding 16. In the case of a neodymium core, samarium ions in the second cladding are normally employed as absorbing ions. However, any other ions known to absorb at 1.06 microns wavelength are contemplated and are within the scope of the invention. The host material normally used is glass. However, it is possible for a crystal to be employed provided the crystal is capable of supporting only the lowest-order mode. In the case of a crystal the $HE_{11}$ mode will be the only mode supported as long as the crystal has a cross-sectional area small enough to support the $HE_{11}$ mode by the method previously taught with reference to FIG. 5. Also the apparatus of FIG. 6 can be employed in order to obtain the lowest-order mode in a crystal. In the case of the crystal, the apparatus of FIG. 6 is the preferred method of obtaining the lowest-order mode, because the technology for obtaining small cross-sectional area in crystals is more difficult than is the case with glass. In some cases it is desirable to use a cross-sectional area larger than that which would support only the lowest-order mode. In this case the noise goes up as the square root of the number of modes. While this degrades the minimum detectable signal accordingly it may still be regarded as tolerable. Hence, the invention is directed toward the use of a smaller number of modes, but of course, with the single mode being the preferred embodiment.

In the case of glass preamplifiers other ions such as ytterbium, erbium, thulium, holmium, and other known active ions can be employed to detect laser signals originating from similarly doped laser transmitters.

Thus preamplifier 18 comprises a host, said host being essentially transparent to light energy at the laser-emissive wavelength of the active ions distributed within said host. The active ions are present within the host in laserable quantities so that in relationship to the prevailing laser-emissive light-absorptive characteristics of the host, there is supported in said host a sufficient inversion in population between two energy levels of the active ions as to provide at the wavelength of stimulated emission of said active ions enough gain in light energy by stimulated emission in excess of all light losses in said laser preamplifier.

Detector Systems

The detector systems of the instant invention employ a laser material as a preamplifier which amplifies incoming signals to a high enough value so that it can be more easily detected by any one of the previously discussed detectors. A limitation in the use of a laser preamplifier in a detector system is imposed by the fluctuation which in the spontaneous emission of the laser material when it is energized to a state of population inversion.

The random and uncontrollable fluctuation which of necessity must be present constitutes the noise associated with this amplifier. This noise is proportional to the square root of the product of the line width and the number of modes propagated by the amplifier. The line width refers to the wavelength interval over which the laser material is capable of providing gain when no filters are used. If a narrow-band filter 40 (FIG. 7) is provided for the laser preamplifier and detector 34 is a detector which detects the output of the preamplifier, then the line width for the filter is the quantity to be used in determining noise. If filter 40 has a band-pass characteristic which is narrower than the line width for gain of the preamplifier, the calculation for the minimum detectable signal allowing for two states of polarization in the lowest order $HE_{11}$ mode and a wavelength interval of 40 A. is 1.200 photons, If filter 40 is used to narrow the wavelength interval to one 1 A. the minimum detectable signal can be reduced to approximately 200 photons. A further reduction in the minimum detectable signal is possible with an even narrower filter. However, the minimum detectable signal can not be indefinitely decreased by further narrowing of the wavelength interval. A practical limit is set by the requirement that the quantity $$\sqrt{N\frac{\Delta\lambda\tau}{2c\lambda^2}}$$

be of the order of unity or greater where $c$ is the velocity of light, $\tau$ is the time duration of the pulse, N is the number of modes and $\Delta\lambda$ is the linewidth. The spontaneous emission for the laser preamplifier has a relatively large average component referred to as DC part of the spontaneous emission.

Figure 7:
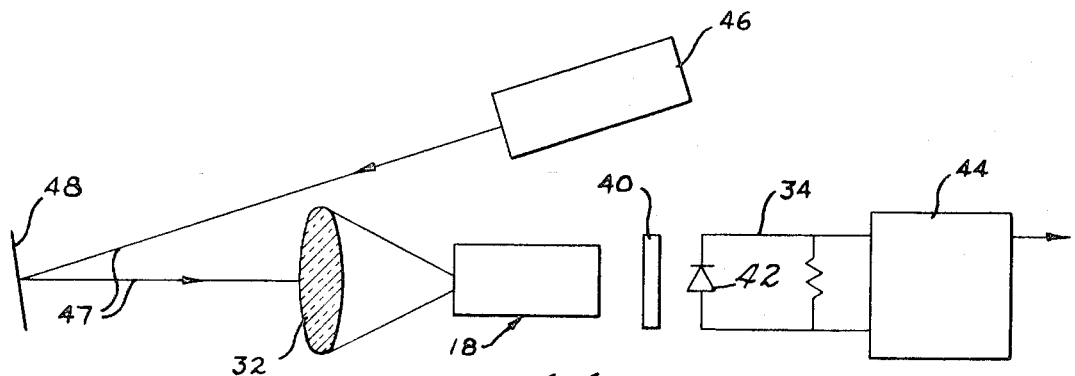
FIG. 7 is a schematic diagram showing an embodiment of the invention in a rangefinder system.

Superimposed on the DC is a fluctuation component. The fluctuation component constitutes the inherent noise limitation of the 1 In order to best utilize the detection capability of the disclosed detection system it is necessary to filter out the DC component. One method for doing this is to use a high band-pass electronic filter in electronic circuit that detects the output from the laser preamplifier. For example, as is shown in FIG. 7 a conventional silicon diode detector 34 could be used to detect light from a neodymium-doped glass fiber laser preamplifier. Silicon diode 42 is used with electronic amplifier 44 which amplifier has a built-in lower band-pass characteristic such that frequencies below 1 megahertz will be blocked and an upper limit in the band-pass characteristic such that pulses whose time duration is in the order of 40 nanoseconds can readily be detected. The above requirement is an approximation and any electronic amplifier having a band-pass characteristic from 50 kilohertz to 30 megahertz can be effectively employed as electronic amplifier 44. Thus the electronic signal sensed by the photodiode is passed through the band-pass filter in amplifier 44 so that only frequency components in excess of 1 megahertz are transmitted for subsequent electronic amplification. In such a scheme pulses of light whose time duration is in the order of 50 nanoseconds can be readily detected.

Figure 8:
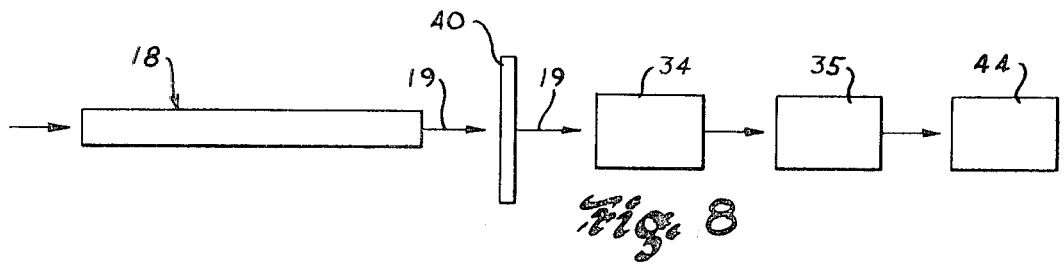
FIG. 8 is an embodiment of the invention as shown in FIG. 7.

FIG. 8 represents a more general schematic of the embodiment as referred to in FIG. 7. In FIG. the amplified the amplified laser signal 19 is passed through filter 40 which filter has a band-pass characteristic narrower than the linewidth for the gain of preamplifier 18. After being filtered laser signal 19 enters detector 34. Detector may be any of the prior art detectors capable of transforming light into electrical energy. Before the transformed light signal enters electronic amplifier 44 it passes through electronic filter 35 which filter has a high-band-pass characteristic such that low frequencies below approximately 50 Kilohertz will be blocked.

FIG. 7 is a schematic diagram of a range-finder system employing a detector of the instant invention. The detector system operates in a conventional manner in that laser transmitter 46 transmits signal 47 to target 48. Signal 47 is reflected by target 48 onto collecting optic 32 which focuses signal 47 onto laser amplifier 18 as was shown with reference to FIG. 2. The instant invention has utility in range-finder system, however, the invention is not intended to be limited to this sole application as the disclosed detector has utility whenever it is necessary to convert light energy into a recognizable signal.

Figure 9:
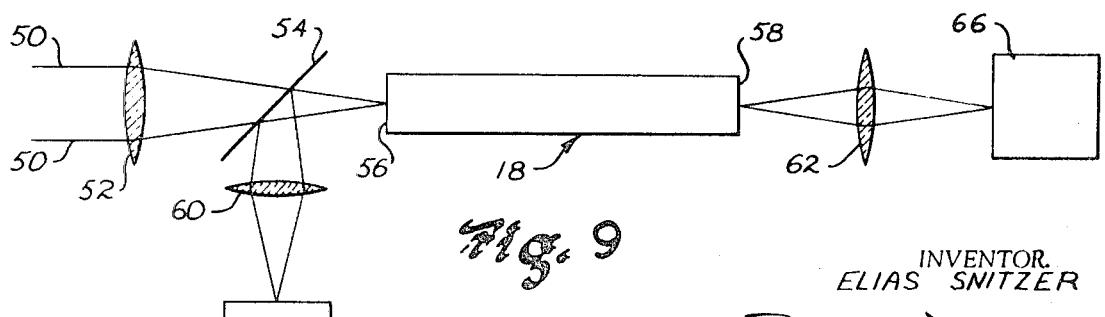
FIG. 9 is a third embodiment of the invention as shown in FIG. 2.

An alternative scheme for filtering the DC component of the spontaneous emission is shown in FIG. 9. Here the incident signal represented by lines 50 is focused by lens 52 through beam splitter 54 onto the entrance end of the fiber laser preamplifier 18. The signal emerging from the far end of the fiber laser preamplifier is increased by the gain of the preamplifier and has added to it the amplified spontaneous emission. Emerging from front end 56 of preamplifier 18 is only the amplified spontaneous emission. The DC value for the amplified spontaneous emission emerging from both ends 56 and 58 of the preamplifier is equal. Lenses 60 and 62 focus light on detectors 64 and 66 respectively if the DC value of the response received by detector 64 is subtracted from the response of detector 66 the remainder is the amplified signal plus the square root of two times the fluctuations of the spontaneous emission.

I claim:

1. A detector system for detecting light at a known wavelength comprising:
   a. a laser preamplifier which amplifies said laser light by providing gain to said light;
   b. means for limiting the number of modes capable of being propagated within said laser preamplifier;
   c. means for blocking low frequency and DC spontaneous emission; and,
   d. means for converting the resulting amplified light into a recognizable signal.

2. A detector system as set forth in claim 1 wherein said laser preamplifier is a solid rod of laserable material and said means for limiting the number of modes capable of being propagated within said laser preamplifier is two pair of lenses, each pair including a mask defining an aperture therebetween; one pair of lenses and mask being positioned along the axis at the entrance end of the laser preamplifier, the second pair of lenses and mask being placed coaxial with the laser preamplifier at the exit end, each lens in a lens pair being spaced from each other by the sum of their focal lengths and said masks being positioned between the two lenses in a lens pair at a distance from each of the lenses equal to the focal lengths thereof and said aperture is a pinhole for passing only the lower order mode and eliminating other modes.

3. The detector system as set forth in claim 2 wherein said solid rod of laserable material is a crystalline host into active ions are doped.

4. A detector system as set forth in claim 1 wherein said said laser light is at a wavelength of 1.06 microns and said laser preamplifier is doped with neodymium ions whereby said preamplifier is capable of providing gain at the wavelength of said laser light.

5. A detector system as set forth in claim 4 wherein said laser preamplifier is a glass laser into which said neodymium ions are doped.

6. A detector system set forth in claim 4 wherein said laser preamplifier is a crystal laser into which said neodymium ions are doped.

7. A detector system for detecting laser light comprising:
   a. a laser preamplifier said laser preamplifier consisting essentially of a host material into which active ions can be doped, said active ions being so selected so as to provide gain by stimulated emission to said light;
   b. means for limiting the number of modes capable of being propagated within said laser preamplifier;
   c. means for blocking low frequency and DC spontaneous emission; and,
   d. means for converting the resulting amplified light into a recognizable signal.

8. A detector system for detecting laser light comprising:
   a. a fiber laser preamplifier which provides gain to said laser light, said fiber laser preamplifier being capable of blocking all modes of propagation except the $HE_{11}$ mode;
   b. means for blocking low frequency and DC spontaneous emission; and,
   c. means for converting the resulting amplified light into a recognizable signal.

9. The detector system as set forth in claim 8 also including a narrow-band filter; said narrow-band filter being located at the output end of said fiber laser preamplifier; said narrow-band filter having a band-pass characteristic narrower than the linewidth for gain of the preamplifier.

10. A detector for detecting laser light comprising:
   a. a fiber laser preamplifier which amplifies said laser light by providing gain to said light;
   b. a beam splitter located at the entrance end of said fiber laser preamplifier;
   c. first and second detectors, said first detector being optically aligned at the exit end of said fiber laser, said second detector being optically aligned with said beam splitter, to receive the amplified spontaneous emission emerging from the entrance end of said laser preamplifier; and,
   d. said first and second detectors comprising means for comparing the resulting amplified light and resulting amplified spontaneous emission.

* * * * *